No. 730,938. Patented June 16, 1903.

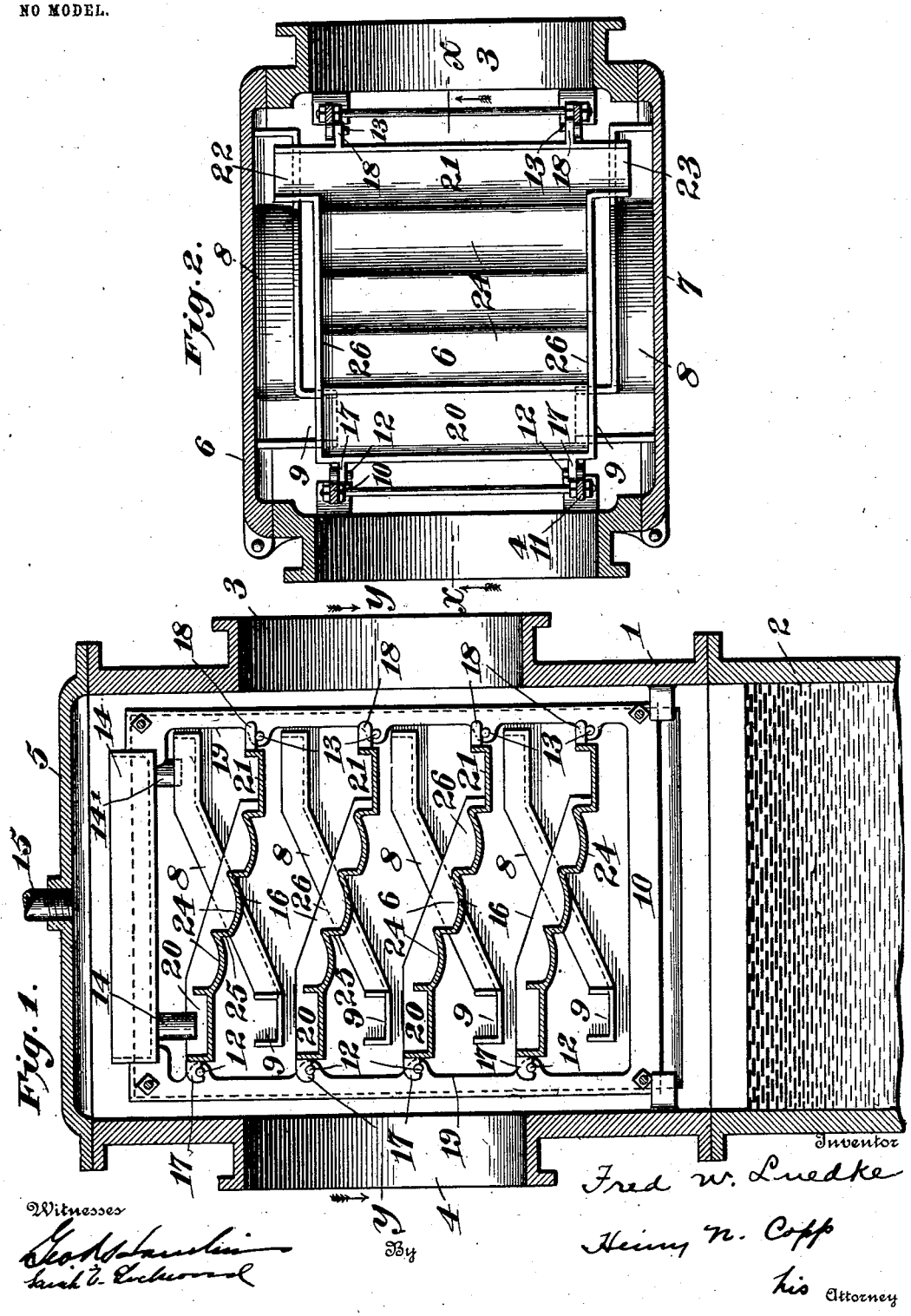

UNITED STATES PATENT OFFICE.

FREDERICK W. LUEDKE, OF PHILADELPHIA, PENNSYLVANIA.

FEED-WATER HEATER.

SPECIFICATION forming part of Letters Patent No. 730,938, dated June 16, 1903.

Application filed January 9, 1903. Serial No. 138,387. (No model.)

*To all whom it may concern:*

Be it known that I, FREDERICK WILLIAM LUEDKE, a subject of the Emperor of Germany, residing at Philadelphia, county of Philadelphia, State of Pennsylvania, have invented certain new and useful Improvements in Feed-Water-Heaters, of which the following is a specification.

My invention relates to open feed-water heaters.

The object of my invention is the provision of a novel and improved feed-water heater of simple and durable construction, which will utilize the steam to the best advantage to obtain the greatest heating effect and prevent carrying off the feed-water by the exhausting steam, as also to provide for the rapid and easy removal of the water-trays, either individually or collectively, for cleaning or other purposes.

A further object is to obviate the necessity for spraying the water and to provide a feed-water heater in which the water will be flowing while subjected to the direct impinging action of the steam.

Having these and other not specifically-mentioned objects in view, the invention consists of certain improved and novel features of construction set forth fully hereinafter and embodied in the appended claims.

In the accompanying drawings, Figure 1 is a vertical section on line $x$ $x$ of Fig. 2, and Fig. 2 a cross-section on line $y$ $y$ of Fig. 1.

The shell 1 has a hot-water chamber 2 in its lower part to receive the water falling from the trays after being heated. The upper part of the shell has a steam-inlet 3 and steam-outlet 4 and is provided with a removable cover 5 and hinged doors 6 and 7 at opposite sides thereof. The doors 6 and 7 are each provided on their interior faces with a series of parallel downwardly-inclined water conductors or chutes 8, arranged at descending levels, the respective chutes on the respective doors being disposed in alinement transversely of the heater and inclining the same on one door as on the other and are by preference cast integral with the doors, but may be made separately, if desired.

The chutes are provided at their lower ends with discharge-mouths 9, turned inwardly toward the center of the heater. Within the heater-shell is a frame composed of two upright rectangular frames 10 and 11, having the two sets of lugs or pins 12 and 13, and these frames are surmounted by the pan 14, which receives the water from the supply-pipe 15. The frames 10 and 11 are removably positioned in the shell and adapted for easy withdrawal with the trays carried thereby through the top of the heater on removing the cover and swinging open the doors.

A series of trays 16 is suspended between the frames 10 and 11 in parallel arrangement at descending levels and inclined oppositely to the chutes by the employment of projections 17 and 18 at the upper and lower ends of the trays, said projections resting on the lugs 12 and 13 and removably positioning the trays so they can be removed from the frames individually and taken out through either door of the heater when desired.

The frames are provided with notches 19 to permit the ready removal of the trays. The trays are nearly as broad as the space between the chutes of one door and those of the other door and at their upper ends are provided with a weir 20 to catch the water issuing from the delivery-mouths of the chutes, while at their lower ends they have a ledge 21 and lateral mouths 22 and 23 to deliver the water laterally to the chutes immediately beneath. The trays have steps or pockets 24, formed by lateral ridges 25, extending from side to side of the tray and terminating at the raised side ledges 26 of the tray. The construction of the trays causes a pocketing or detaining of the water as it flows from the weir to the bottom of the tray, and thus insures complete utilization of the heating effect of the steam, while the inclined disposition of the trays and their facing the steam-inlet gives a direct heating effect equally on the water flowing down all of the trays. The construction and arrangement of the trays and chutes and flowing of the water thereover also prevent the water from being carried off by the steam as it passes from the heater.

The water being fed into the pan 14 passes therefrom via pipes 14' and 14" into the weir of the uppermost tray and into the uppermost chutes of the two series. From the lower end of the uppermost tray the water flows into the two chutes immediately therebelow, thence over the third tray from the top, thence down the lowermost chutes, and into the hot-water chamber. The water flowing down the uppermost chutes passes over the second tray, thence down the third set of chutes, and finally over the lowermost tray and into the hot-water chamber. During the passage of the water down the chutes and trays it is subjected to the impinging action of the steam.

Having thus described my invention, what I claim as new, and desire to secure by Letters Patent, is—

1. In a feed-water heater, the combination with inclined trays for the passage of the water, of means arranged for delivering steam directly toward and onto the inclined faces of all of the trays.

2. In a feed-water heater, the combination with inclined trays for the passage of the water located one above the other and arranged for the steam to impinge thereon, of means for delivering steam laterally directly toward and onto the inclined faces of all of the trays.

3. In a feed-water heater, the combination with inclined trays for the passage of the water, of means arranged for delivering steam directly toward and onto the water flowing over all the trays.

4. In a feed-water heater, the combination with inclined trays arranged to receive the direct impinging action of the steam on the inclined faces thereof, of means for conveying the water from one tray to another tray, and means arranged for delivering steam directly toward and on the water flowing over all the trays.

5. In a feed-water heater, the combination with inclined water-trays arranged to receive the impinging action of the steam, of water-conveying chutes for conducting the water from tray to tray, and means arranged for delivering steam directly on the water flowing over all the trays and also directly against all the chutes.

6. In a feed-water heater, the combination with inclined water-conveying trays arranged to receive the impinging action of the steam, and chutes inclined reversely to the trays and adapted for conducting the water from tray to tray and also arranged to receive the impinging action of the steam, of means arranged for delivering steam directly on the water flowing over all the trays and also directly against all the chutes.

7. In a feed-water heater, the combination with a steam-supplied heater-shell and a door therefor, of water-conductors carried by the door, and water-trays in the shell, said water-conductors and water-trays being arranged when the door is closed to deliver the water to each other.

8. In a feed-water heater, the combination with a steam-supplied heater-shell, of water-trays in the shell, doors for the shell and at opposite sides of the water-trays, and water-conductors carried by the doors, said water-conductors and water-trays being arranged when the doors are closed, to deliver the water to each other.

In testimony whereof I hereunto affix my signature in presence of two witnesses.

FRED. W. LUEDKE.

Witnesses:
SALLIE R. CAMAC,
J. W. CAMAC.